United States Patent Office 3,108,721
Patented Oct. 29, 1963

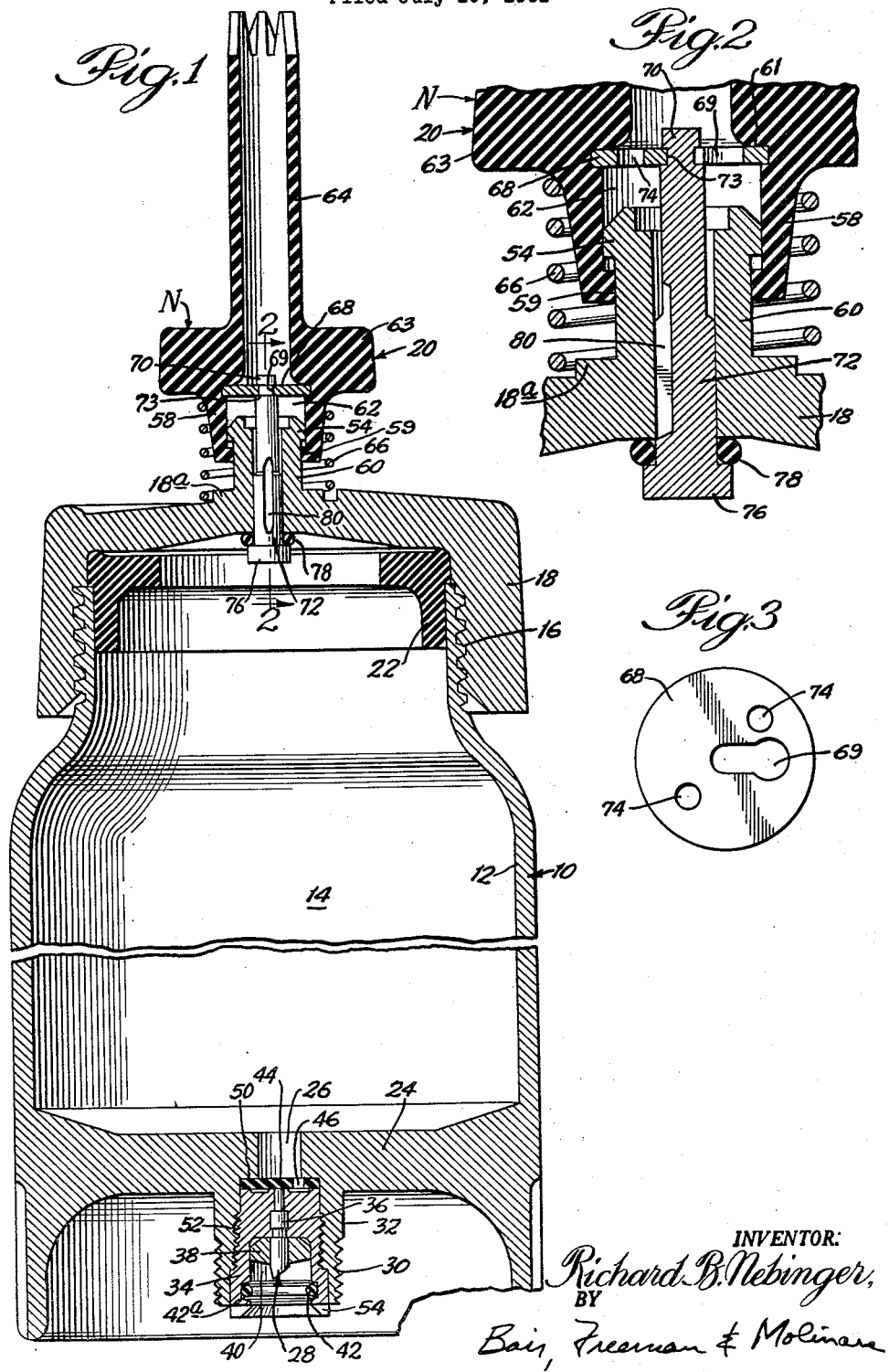

3,108,721
FOOD DISPENSER
Richard B. Nebinger, St. Louis, Mo., assignor to Knapp-Monarch Company, St. Louis, Mo., a corporation of Delaware
Filed July 10, 1961, Ser. No. 122,833
3 Claims. (Cl. 222—394)

This invention relates in general to cream dispensers, and more particularly relates to a cream dispenser valve arrangement which is particularly characterized as being susceptible of easy and rapid disassembly and cleansing.

Recent years have seen a great increase in the number of products, such as cream, which are packaged under gas pressure. Such packaging requires an inlet valve by means of which the mixture of cream and propellant gas is forced into a container, and an outlet valve by means of which the cream is propelled by gas pressure from within the container when it is to be used. When cream passes through such valve assemblies, it is important that portions of the cream not be deposited in tiny crevices nooks, bends, depressions or apertures, since cream is such an excellent material for the formation of bacterial colonies, and bacterial colonies and/or other impurities may easily collect in such crevices and the like. Heretofore, health authorities have, therefore, insisted that the valve through which a food such as cream passes be of a type which is capable of thorough and easy cleansing and to this end such valves must be provided with a minimum of crevices, depressions, or openings in which food or other particles can collect. Furthermore, such food dispensing valves must be capable of convenient disassembly, or dismantling, to enable substantially complete access to all surfaces of the various components thereof.

It is, therefore, one object of the present invention to provide a cream dispenser having improved inlet valve and outlet valve assemblies through which the cream passes, and which valves are susceptible of relatively easy and complete cleansing.

It is a further object of this invention to provide an improved dispensing valve assembly for use with cream dispensers and the like, which valve is of a nature to permit controlled dispensing of cream therethrough and which valve construction is characterized by the fact that most objectionable crevices, depressions and/or other configurations therein, which might have sharp corners, are avoided.

It is a further object of this invention to provide an improved dispensing valve arrangement for a cream dispenser in which all parts of the valve are easily accessible for complete cleansing.

These and other objects of the present invention will become apparent on examination of the following specification, claims and drawings wherein:

FIGURE 1 illustrates in a fragmentary cross-section view a typical cream container and dispenser which utilizes therein valves that embody the principles of the present invention.

FIGURE 2 is an enlarged fragmentary, axial cross-sectional view of the dispensing valve taken along the line 2—2 in FIGURE 1; and FIGURE 3 is a plan view of the assembly washer used in the discharge valve assembly.

Referring now to the drawings, the cream dispenser is illustrated by the reference character 10. It comprises an aluminum, impact-extruded, container having a cylindrically shaped wall structure 12 surrounding the storage cavity 14 and with a cappable open upper end. The external surface of wall 12 adjacent the open end is provided with threads 16 which permits the assembly on that end of the cast aluminum closure cap 18 carrying an outlet, or discharge, valve assembly 20 and the annular sealing gasket 22. The lower end of the container is closed by a bottom wall 24 having a central aperture 26 through which materials, which are to be later dispensed from discharge valve 20, are to be introduced into cavity 14. Entry into aperture 26 is effected through a tubular piercing valve means 28 which is adapted to pierce a pressurized bulb, or the like, as is well known in the art.

The structure on the bottom wall 24 provides means adapted to effect selective bulb piercing to aid in filling cavity 14 of the container. Toward that end, wall 24 provides a tubular stud 32 having threads 30 to which a nut-type bulb-holding connector, or collar (not shown), may be selectively connected. The piercing valve means 28 includes an annular valve body, or bushing 34, of aluminum or bronze, which is screw threaded into stud 32 and which carries a central tubular piercing pin 36 of stainless steel that has been press fit into the bushing 34. The exterior piercing pin 36 is provided with a circumferential groove 37 for engagement with portions of bushing 34 as shown to retain the pin 36 in bushing 34 because of the sharp edge defined by the groove. The lower end of piercing pin 36 extends outwardly, or below an annular aluminum spacer 38 positioned in recess 40 in valve body 34. An O-ring 42 is provided in an inner peripheral groove 42a defined in body 34 and surrounding recess 40. The O-ring 42 is adapted to sealingly engage the neck of a pierceable bulb portion that is entered into recess 40. The sharpened piercing tip of pin 36 is located axially between O-ring 42 and spacer 38.

A check valve member 44 comprising simply a disc of rubber, or similar material, having an aperture 46 therethrough offset relative to the bore of pin 36 is seated against a shoulder 50 defined on wall 24 and is held firmly in place against the inner end of tubular pin 36 when the body, or bushing, 34 is threaded in the stud 32 by means of threads 52. The check valve 44 not only serves as a valve member but also as a seal between bushing 34 and stud 32. The offset aperture 46 enables the material being introduced into cavity 14, such as cream, to pass from the bore in pin 36 and through valve member 44 and through the opening 26 into the cavity 14. A suitable key means, or slot, 54 is provided at the outer end of the body 34 to enable its being assembled and disassembled relative to stud 32 to provide easy access to both the valve means 28 and valve member 44 for purposes of servicing and complete cleaning. Since the valve member 44 is a simple disc which is separate from the other components, and since the aperture 46 therein is also completely accessible, said parts may be cleaned without any difficulty, while the bore in the stainless steel pin 36, being completely free of bends or sharp corners, likewise presents a minimum in cleansing difficulties.

To fill the cavity 14, suitable means which contains cream under pressure, usually a bulb filled with nitrous oxide under high pressure, is connected to stud 32 with the neck of the bulb inserted into recess 40 to engage the spacer 38, by which time it is suitably pierced by pin 36 and the cream is discharged from the bulb under pressure through the central aperture of the pin. The pressurized material moves resilient valve member 44 away from the inner end of pin 36 so that material flows through apertures 46 and 26. When the pressurized bulb is withdrawn, or when the pressure in cavity 14 is at least as great as the pressure on material in pin 36, then check valve member 44 reseats against tubular pin 36 and prevents any attempt of backflow of material from cavity 14 through pin 36.

The discharge valve assembly 20 is composed of six parts, namely a molded rubber nozzle N, a valve stem 72, the cap 18 which defines a tubular stud 60 thereon, a push washer 68 which detachably connects the valve stem 72 and molded rubber nozzle N, an O-ring 78, and a spring 66. The cap 18 is shaped to define integral therewith an elongated tubular stud 60, the upper end of which is outwardly enlarged at 54. The molded nozzle N is formed of rubber and is shaped to define an elongated tubular nozzle part 64 the lower end of which merges with an enlarged gripping part 63. Below the gripping part 63, the interior of the nozzle N is enlarged to define a chamber 62. At the upper end of chamber 62, the interior of resilient nozzle N is provided with an internal retaining groove 61 into which the push washer 68 may be snapped thereby providing for simple assembly and disassembly of push washer 68 and nozzle N. The portion of nozzle N below gripping part 63 defines an annular skirt 58 terminating at its lower end in an inturned flange 59.

The valve stem 72 is elongated and is provided at its lower end with an enlarged head 76 that is of greater dimension than the interior dimension of tubular stud 60. The O-ring 78 is positioned on stem 72 between head 76 and the underside of cap 18. A portion of stem 72 above the mounting for O-ring 78 is axially grooved at 80, so as to provide for a flow passageway through stud 60 when stem 72 is depressed sufficiently for groove 80 to communicate with the storage cavity 14. The stem 72 is of a length to extend upwardly through stud 60 and project thereabove. Adjacent the upper end of stem 72 there is provided a circumferential recess 73 of substantially the same axial length as the thickness of push washer 68. The upper tip of stem 72 thus defines a head 70 that is enlarged relative to recess 73.

The push washer 68 is provided with a radially elongated key-hole slot 69 with the enlargement of slot 69 offset from the center of the washer. The enlargement of slot 69 permits passage of stem head 70 therethrough. The remainder of slot 69 slidably receives the necked portion of stem 72 that is adjacent recess 73. The washer 68 is provided with a plurality of flow apertures 74.

The coil spring 66 surrounds skirt 58 of nozzle N and has its lower coil engaging cap 18 and arranged to be centered by boss 18a defined thereon, while the upper coil of spring 66 engages the underside of enlarged gripping part 63 on nozzle N.

To assemble valve assembly 20, the O-ring 78 is assembled against head 76 on stem 72 and the stem 72 is then inserted through tubular stud 60 when cap 18 is removed from the container. The push washer 68 is then assembled on stem 72, the keyhole 69 permitting such assembly without use of threads or tools. The spring 66 is assembled on cap 18 and the nozzle N is then push fit onto both the push washer 68 and stud 60, the resiliency of nozzle N providing for snapping washer 68 into recess 61 and for snapping flange 59 over enlargement 54 and stud 60. When so assembled, the spring 66 normally biases the parts to the closed valve position in the figures. The stud enlargement 54 engages the interior of skirt 58 while the flange 59 engages the stud 60 to provide a resilient double seal to prevent leakage of cream being dispensed from the device.

In operation, the nozzle N is normally gripped at enlargement 63 and pressed downwardly against spring 66. This moves stem 72 inwardly of cavity 14 until one end of groove 80 passes O-ring 78 and communicates with cavity 14, at which time the pressurized cream in cavity 14 will flow through groove 80 around O-ring 78 and through stud 60 into chamber 62 and through a portion of keyhole 69 and apertures 74 through tubular nozzle part 74. When stem 72 is depressed, the O-ring 78 remains in position against cap 18 because of the gas pressure in cavity 14.

It will be observed that upon disassembly of the parts of discharge valve assembly 20, the flow passageways through nozzle part 74 and stud 60 are completely smooth, thereby inhibiting deposit of cream in crevices or recesses and facilitating cleaning of those parts. The other parts are completely exposed for easy and complete cleaning of all surfaces. No special tools are needed for assembly or disassembly and no internal screw threads are provided which might serve as a lodging place for cream where bacteria could propagate. The inlet valve 28 is similarly easily disassembled with use of a very simple tool or a 50¢ piece entered into slot 54 to effect unscrewing of bushing 34 from stud 32. The parts of inlet valve 28 that are exposed to the incoming cream do not have internal threads, and again the pin 36 provides a passageway that is completely smooth, while valving member 44 is easily removed for complete cleaning.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A food container having a cavity in which food, such as cream is adapted to be held under greater than atmospheric pressure including a valve, said valve comprising a stem having a recess in its outer wall and arranged so that said stem is normally biased to maintain said recess out of communication with said cavity, whereby passage of food from said cavity past said stem is prevented, and control means for enabling said stem to be selectively reciprocated for bringing a portion of said recess into communication with said cavity while another portion thereof is exterior of said cavity, whereby food under pressure may pass from said container through said recess, said control means including a plate member having an aperture shaped to detachably receive a portion of said stem.

2. A food container having a cavity in which food, such as cream, is adapted to be held under greater than atmospheric pressure including a valve, said valve comprising a stem having a recess in its outer wall and arranged so that said stem is normally biased to maintain said recess out of communication with said cavity, whereby passage of said food from said cavity past said stem is prevented, and control means for enabling said stem to be selectively reciprocated for bringing a portion of said recess into communication with said cavity while another portion thereof is exterior of said cavity, whereby said food under pressure may pass from said container through said recess, said control means including a nozzle defining a flow passageway and being detachably connected to a plate having a plurality of apertures therethrough which communicate with said flow passageway, and one of said apertures being shaped to detachably receive a portion of said stem.

3. A food container having a cavity in which food, such as cream, is adapted to be held under greater than atmospheric pressure including a valve, said valve comprising a steam having a recess in its outer wall and arranged so that said stem is normally biased to maintain said recess out of communication with said cavity, whereby passage of said food from said cavity past said stem is prevented, and control means for enabling said stem to be selectively reciprocated for bringing a portion of said recess into communication with said cavity while another portion thereof is exterior of said cavity, whereby said food under pressure may pass from said container through said recess, said control means including a nozzle defining a flow passageway and detachably connected to a plate having a plurality of apertures therethrough which communicate with said flow passageway, and one of said apertures being shaped to detachably receive a portion of said stem, and another portion of said stem carrying an O-ring for normally sealing said container against the passage of food around said stem.

References Cited in the file of this patent

UNITED STATES PATENTS

| | | |
|---|---|---|
| 529,221 | Wagner | Nov. 13, 1894 |
| 2,585,253 | Kochner | Feb. 12, 1952 |
| 2,591,514 | Courtot | Apr. 1, 1952 |
| 2,630,942 | Shaffer | Mar. 10, 1953 |
| 2,913,154 | Kuffer | Nov. 17, 1959 |